Oct. 19, 1965  A. B. BASS  3,212,810
COLLAPSIBLE HOUSE TRAILER
Filed Jan. 2, 1964  4 Sheets-Sheet 1
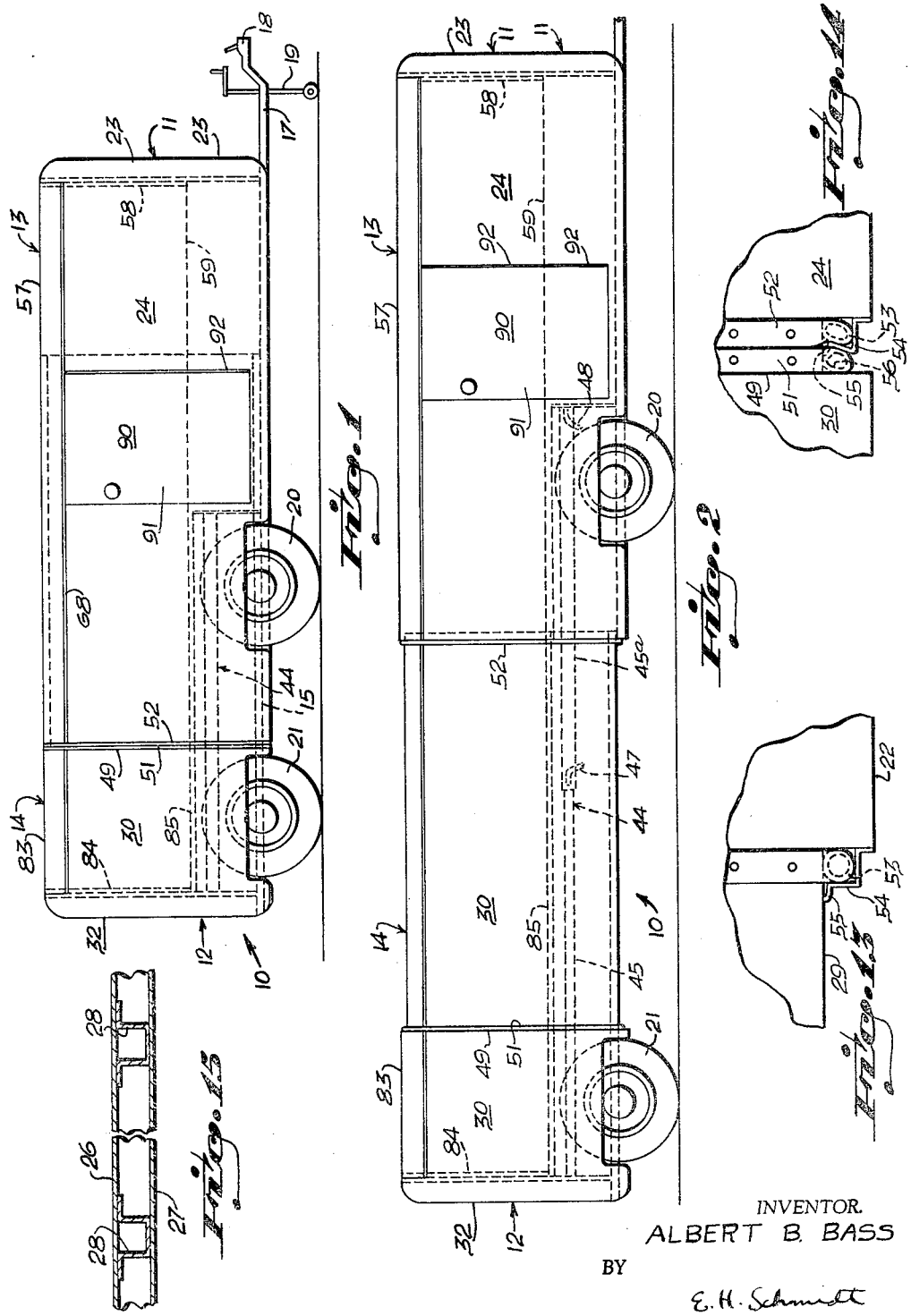
INVENTOR.
ALBERT B. BASS
BY
E. H. Schmidt
ATTORNEY.

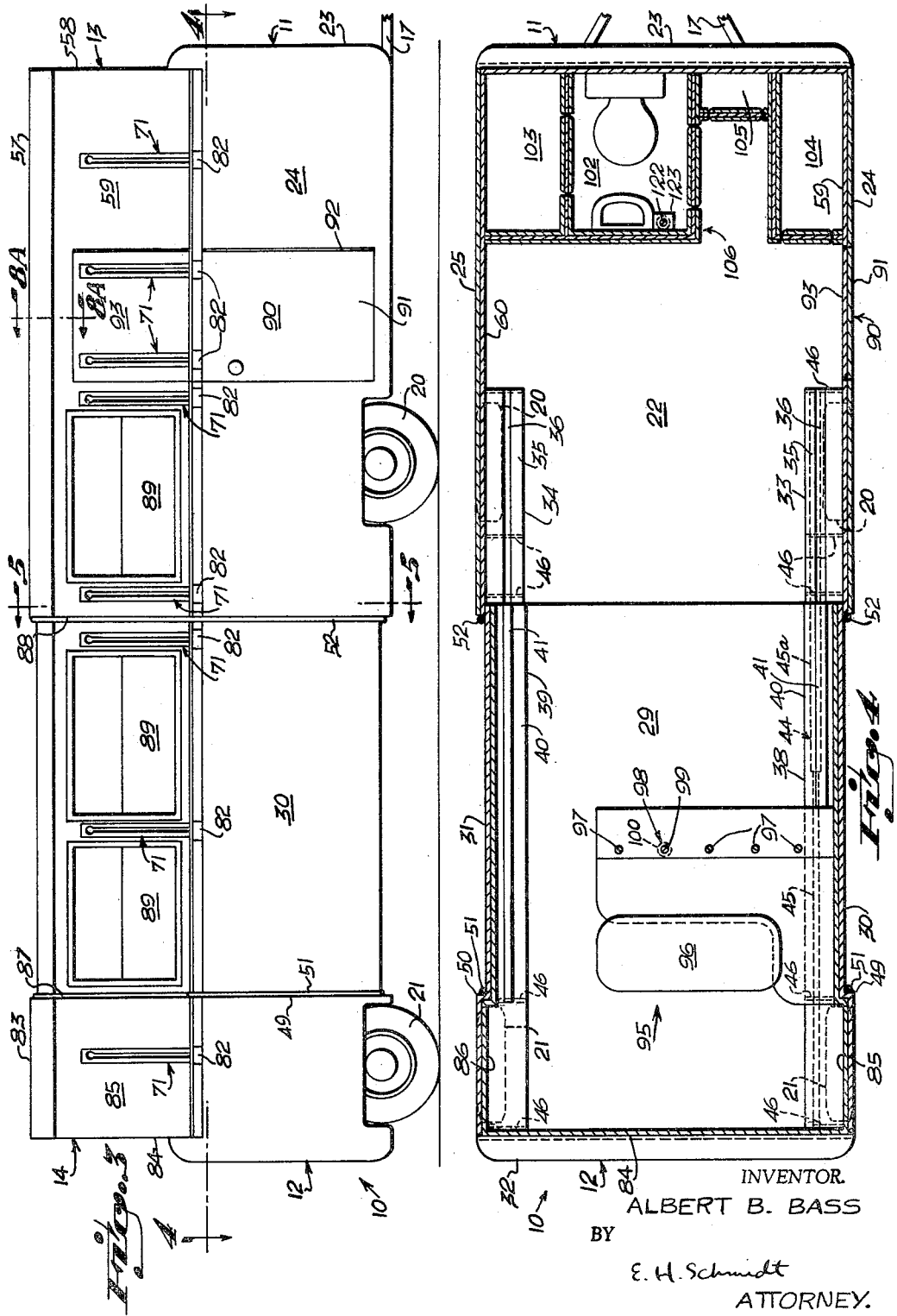

Oct. 19, 1965      A. B. BASS      3,212,810
COLLAPSIBLE HOUSE TRAILER
Filed Jan. 2, 1964      4 Sheets-Sheet 3
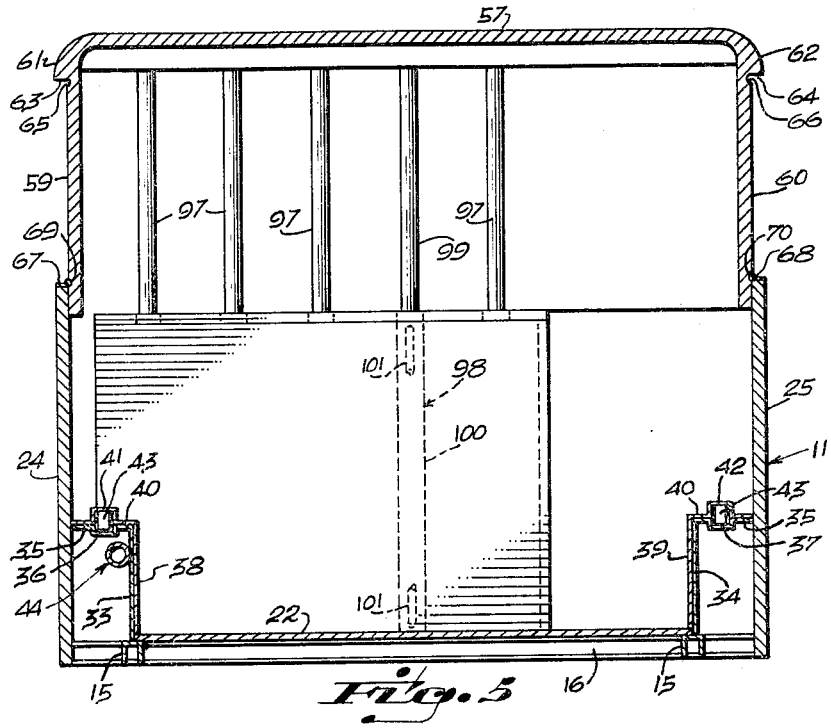
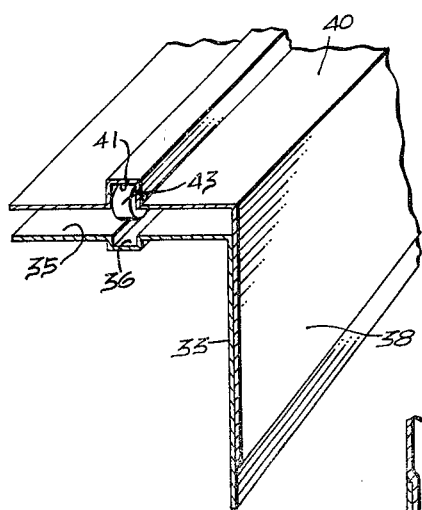
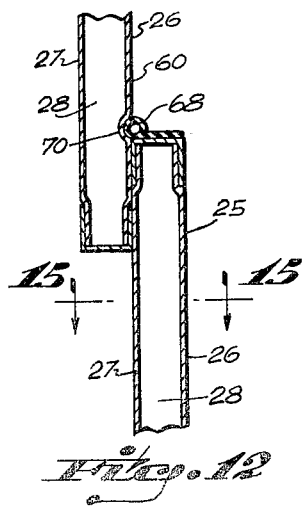
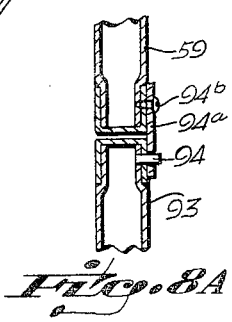
INVENTOR.
ALBERT B. BASS
BY
E. H. Schmidt
ATTORNEY.

Oct. 19, 1965  A. B. BASS  3,212,810
COLLAPSIBLE HOUSE TRAILER
Filed Jan. 2, 1964  4 Sheets-Sheet 4
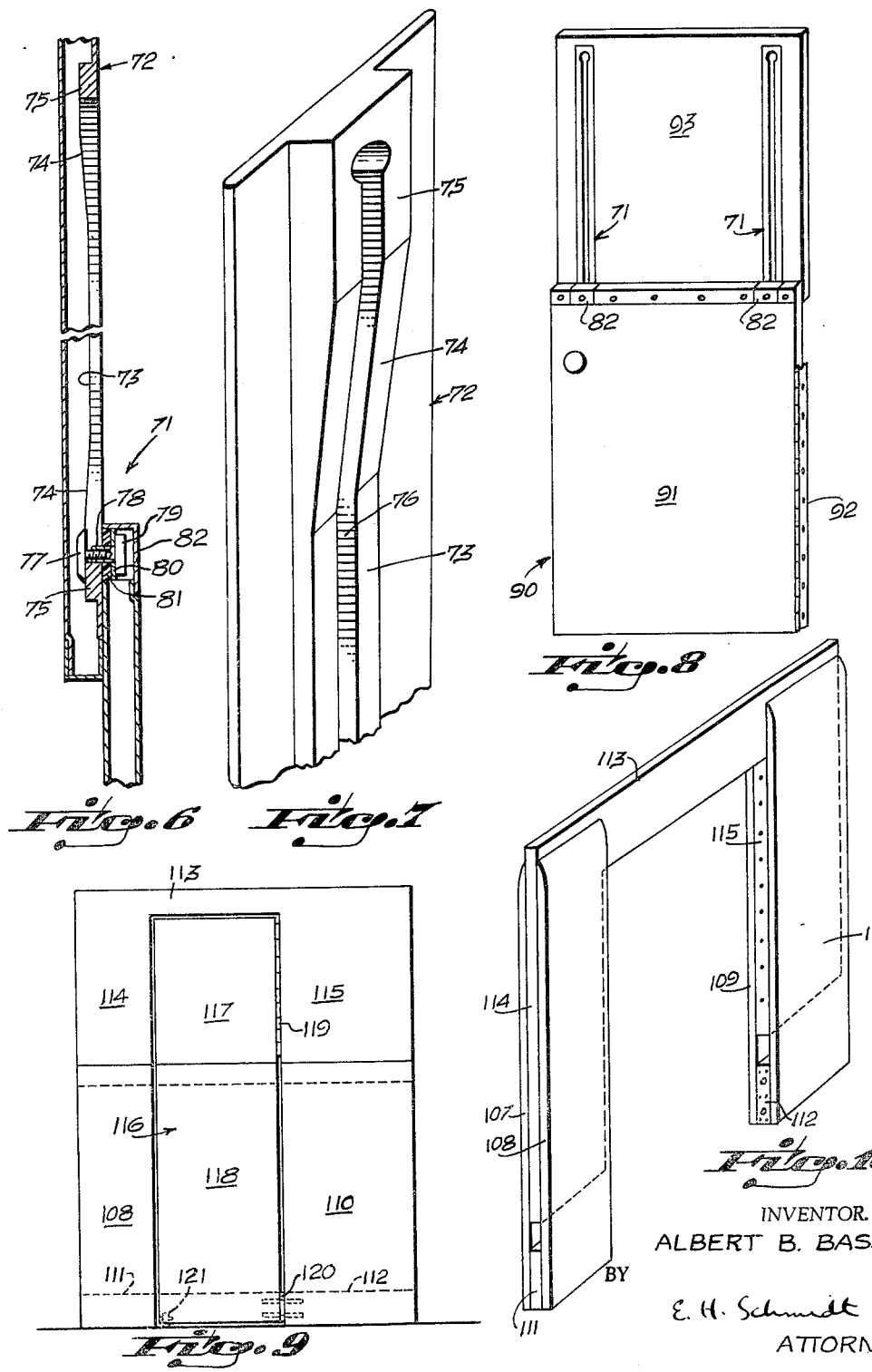
INVENTOR.
ALBERT B. BASS
BY
E. H. Schmidt
ATTORNEY.

United States Patent Office 3,212,810
Patented Oct. 19, 1965

3,212,810
COLLAPSIBLE HOUSE TRAILER
Albert B. Bass, 8130 Meridian Drive, Hollywood, Fla.
Filed Jan. 2, 1964, Ser. No. 335,064
8 Claims. (Cl. 296—23)

My invention relates to house trailers, and is directed particularly to improvements in collapsible luxury house trailers.

The principal object of my invention is to provide a spacious luxury house trailer having many of the comforts of home while traveling or camping, or for use as a mobile home, yet which, when not in use, can be compacted into a small fraction of its extended volume to provide the least visual obstruction and wind resistance while being hauled from place to place.

A more particular object of the invention is to provide a house trailer of the character described which comprises telescoping forward and aft sections, each of which comprises telescoping upper and lower sections, so arranged as to permit telescoping both horizontally and vertically to achieve maximum size reduction.

Yet another object is to provide a collapsible house trailer of the character described having collapsible room partitions and doors, and including power means for automatically controlling the collapsing and expanding of said forward and aft and upper and lower sections together with their partitions and doors.

Still another object is to provide improved track means interconnecting the forward and aft sections of the trailer for relatively horizontal movement in expanding and collapsing.

Yet another object is to provide a collapsible house trailer of the above nature including mechanism for automatically securing the upper and lower sections in tight interfitting engagement at their fully extended and fully collapsed relative positions, to insure rattle-free structural performance as well as weatherproofing.

Still another object is to provide a collapsible house trailer of the character described which will be simple in structure, economical to manufacture, attractive in appearance and foolproof and durable in operation.

Other objects, features and advantages of the invention will be apparent from the following description when read with reference to the accompanying drawings.

In the drawings, wherein like reference numerals denote corresponding parts throughout the several views:

FIG. 1 is a side elevational view of an improved collapsible house trailer embodying the invention, shown in fully collapsed condition;

FIG. 2 is a view similar to FIG. 1 but showing the house trailer in horizontally expanded condition;

FIG. 3 is a side elevational view showing the house trailer in the fully expanded condition, both horizontally and vertically, and ready for use;

FIG. 4 is a horizontal cross-sectional view of the house trailer taken along the line 4—4 of FIG. 3 in the direction of the arrows;

FIG. 5 is a vertical cross-sectional view of the house trailer taken along the line 5—5 of FIG. 3 in the direction of the arrows;

FIG. 6 is a vertical cross-sectional view of one of the slide guide mechanisms controlling the relatively vertical movement of the upper and lower trailer sections and the associated collapsible door;

FIG. 7 is an oblique view of an end portion of the guide track forming part of the slide guide mechanism illustrated in FIG. 6;

FIG. 8 is a front elevational view of the collapsible trailer entrance door, shown separately on an enlarged scale and in expanded condition;

FIG. 8a is an elevational detail view illustrating mechanism for holding the upper section of the door in hooking engagement with respect to the forward upper section for vertical movement therewith upon expanding and collapsing;

FIG. 9 is a front elevational view of a partition in the interior of the trailer, shown separately;

FIG. 10 is an oblique view of the partition shown in FIG. 9, without the associated door and on an enlarged scale;

FIG. 11 is a vertically exploded oblique view of a portion of the track mechanism controlling the relatively horizontal telescoping action of the forward and aft sections of the trailer;

FIG. 12 is a vertical cross-sectional view of interfitting wall portions of upper and lower sections of the house trailer illustrating details thereof and details of the weatherproofing mechanism;

FIG. 13 is a fragmentary view, in end elevation, of the seal and scrape mechanism provided at the horizontal juncture at the lower ends of the forward and aft trailer sections as seen when the sections are in expanded condition;

FIG. 14 is a view similar to FIG. 13 but showing the seal and scrape mechanism when the forward and aft sections are in telescoped condition; and FIG. 15 is a cross-sectional view taken along the line 15—15 of FIG. 12.

Referring now in detail to the drawings, 10 in FIGS. 1 through 4 designates a collapsible house trailer embodying the invention, the same comprising, generally, a forward lower section 11, an aft lower section 12, a forward upper section 13, and an aft upper section 14. As is hereinbelow described, the upper sections 13 and 14 telescopingly collapse into the lower sections 11 and 12, respectively, and the aft sections 12 and 14 telescopingly collapse into the forward sections 11 and 13, respectively, whereby the trailer can be collapsed both vertically and horizontally from the extended position of use, as in FIG. 3, to the collapsed condition as illustrated in FIG. 1.

As illustrated in FIG. 5, the forward and aft trailer sections 11 and 12, respectively, are each supported on a bottom framework of longitudinal steel channel members 15 interwelded with transverse steel channel members 16 to provide a flat bed (only framework associated with the forward section 11 being illustrated in FIG. 5). As illustrated in FIG. 1 and partially illustrated in FIG. 4, the front end of the framework 15, 16 of the forward trailer section 11 is provided with a forwardly-projecting portion 17 terminating in the usual trailer hitch 18 and a retractable support wheel mechanism 19. As best illustrated in FIG. 2, the framework 15, 16 of the forward lower section 11 has attached thereto, near the rear end, a spring and axle mechanism (not illustrated) supporting a pair of forward trailer wheels 20, and the framework of the aft lower section 12 has similarly attached, near the rear end, a spring and axle mechanism (not illustrated) supporting a pair of rear trailer wheels 21.

As best illustrated in FIGS. 2, 4, and 5, the forward lower section 11 of the trailer 10 has a flat floor panel 22 supported upon the framework structure 15, 16, a front wall 23, and side walls 24, 25. The front wall 23 and side walls 24, 25, as well as the remainder of the trailer side, front back and top walls of the trailer sections to be hereinbelow described, are all preferably fabricated, as best illustrated in FIGS. 12 and 15, of parallel inner and outer panel members 26, 27 secured in spaced relation against the opposite sides of flat channel reinforcing members 28 as by riveting or spot welding. Insulation (not illustrated) such as of fiber glass batting preferably fills the voids between the inner and outer panel members 26, 27.

The aft lower trailer section 12 is similarly provided with a floor panel 29, side walls 30, 31 and a rear wall 32.

Guide means is provided for supporting the aft lower trailer section 12 for in and out telescoping motion with respect to the forward lower section 11. To this end, the forward lower section 11 has secured along each inside longitudinal corner thereof, as by welding to the framework 15, 16, track members 33, 34 of angle iron formation in inverted disposition so as to "box in" said corners. The upper faces 35 of the track members 33, 34 are formed with downwardly projecting central, longitudinally extending rectangular recesses or tracks 36, 37 (see FIG. 11). The aft lower trailer section 12 similarly is fitted with track members 38, 39 of such size and so arranged as to nest over the forward track members 33, 34, respectively (see FIG. 5). The upper faces 40 of the aft track members 38, 39 are formed with upwardly projecting, longitudinal rectangular recesses 41, 42 in register with and complemental to the respective recesses in the forward track members 33, 34. A plurality of rollers 43, preferably ball bearing rollers, are journalled in spaced relation within and along the recesses 41, 42, which rollers rest in the tracks 36, 37 of the forward track members 33, 34, thereby providing vertical support for the aft lower trailer section 12 with respect to the forward section 11 and at the same time permitting smooth mutual in and out or telescoping movement of said lower trailer sections.

Hydraulic means is provided for automatically moving the forward and aft lower trailer sections 11 and 12 between the extended and retracted or collapsed conditions. To this end, a double-acting hydraulic cylinder 44 is fitted in the longitudinal well formed by the interfitting track members 33, 38 at one side of the trailer (see FIGS. 2, 4, and 5), the actuating piston 45 thereof being connected in any suitable manner, such as an end gusset plate (not illustrated) in the channel member 38, to the aft trailer section 12; and the cylinder 45a thereof being connected as by a gusset plate 46 in the end of channel member 33 in the forward trailer section 11. A plurality of gusset plates 46 are welded along the channel members 33 and 34 for strengthening purposes. Flexible hydraulic lines, partially indicated at 47 and 48 in FIG. 2, lead to the usual hydraulic pump and control system, which forms no part of the invention and therefore is not further described herein. Limit switches (not illustrated) can be used to automatically stop the relative movement of the aft trailer sections with respect to the forward sections at the fully collapsed and fully extended positions.

As illustrated in FIG. 4, the side walls 30, 31 of the aft lower section 12 are inwardly offset so as to by-pass, in spaced relation, the insides of the side walls 24, 25, respectively, of the forward lower section 11. The spacing is sufficient to receive therein the adjacent side wall of the upper forward section 11, as is hereinbelow described. The vertical shoulders 49 and 50 at the offset are fitted with tubular, resilient seals 51 which abut similar seals 52 fitted about the outer edges of the side walls 24, 25 of the forward lower section 11 to provide weatherproofing when the trailer is in collapsed condition. A tubular seal 53 is also secured along the outer edge of the floor panel 22 of the forward lower section 11, which seats against the underside of the floor panel 29 of the aft lower section 12, as illustrated in FIG. 13. A rectangularly bent channel 54 is secured along the outer edge of the floor panel 22 in enclosing relation to the tubular seal 53, said channel being formed along its upper edge with a bent-out scraper portion 55, operative to scrape along the underside of the floor panel 29 associated with the aft section 12 to clean it of road mud, etc., as said aft section is retracted into the forward section. FIG. 14 further illustrates how the upstanding portion of the bent channel 54 is slighly inwardly deflected in its sealing abutment with a tubular seal member 56 secured against the outer edge of the floor panel 29 of the aft lower section 12.

The forward upper section 13 of the trailer has a roof panel 57, a front panel 58 and side panels 59, 60, and is of such size and shape as to nest down and within the forward lower section 11 with the rear edges of said panels substantially flush with the rear edges of said lower section, as best illustrated in FIG. 3.

As illustrated in FIG. 5, the sides of the roof panel 57 overhang slightly as indicated at 61, 62 to provide shoulders 63, 64 along the insides of which are formed arcuate recesses 65, 66. The upper longitudinal edges of the side walls 24, 25 of the forward lower trailer section 11 are fitted with tubular seals 67, 68 of resilient material which, when the upper section 13 is nested or collapsed in said lower section, seat in the respective recesses 65, 66 to form a weatherproof seal. Similarly, when the upper section 13 is in expanded condition, the weatherproofing seals 67, 68 seat in longitudinal recesses 69, 70 formed along the lower edges of the side panels 59, 60 (see FIGS. 5 and 12).

Means is provided for guiding the forward upper section 13 in its up and down movement with respect to the forward lower section 11. To this end, a plurality of identical guide mechanisms 71 are provided at spaced intervals along the wall sections, the constructional details of said mechanism being illustrated in FIGS. 6 and 7. As illustrated in FIG. 6, each of the guide mechanisms 71 comprises an elongated track plate 72 having a centrally-disposed central guide plate section 73 of rectangular cross-section which extends at each end into relatively short, inclined guide plate sections 74 which, in turn, terminate in end guide plate sections 75 of rectangular cross-section and substantially increased thickness as compared with the thickness of the central guide plate section 73. A longitudinal through slot 76 extends centrally along the central, inclined and end guide plate sections 73, 74, and 75, respectively. As illustrated in FIG. 6, the track plates 72 are secured within the side panels of the upper trailer sections flush with the outer surfaces thereof and with the guide plate sections 73, 74 and 75 facing inwardly. A flat-head slide screw 77 extends through the slot 76 of the track plate 72, with the head undersurface thereof in abutting engagement against the longitudinal guide surface provided by the guide plate sections 73, 74 and 75. The internally threaded shank 78 of a flat-head nut 79 extends through a washer 80 and resilient bushing 81 to engage with the threaded shank of the slide screw 77. The bushings 81 and nuts 79 are secured with respect to the upper edge of the side wall panel of the corresponding lower trailer sections. As illustrated in FIG. 6, when the upper section is fully extended with respect to the lower section, the head of the nut 79 will be drawn inwardly by the increased thickness afforded by the lower end guide plate section 75 of the track plate 72, to hold the overlapping portions of the upper and lower panels in tight-fitting face-to-face relation for weatherproofing and rattlefree performance. Similarly, when the upper section is fully retracted or collapsed, the head of the nut 79 will again be drawn inwardly to provide weatherproofing and rigidity while the trailer is not in use or is being carried from place to place. The relative looseness afforded in the guide mechanism at intermediate positions of relative movement of the upper and lower trailer sections serves to minimize frictional resistance and contributes to the smooth performance of the automatic extension and retracting operation by the hydraulic means hereinbelow more fully described. The resiliency afforded by the bushing 81, which is preferably of a synthetic material such as neoprene, permits angle planing of the nut head 77 along the inclines 74, and also prevents accidental binding. An angle cover plate 82 is removably secured at the upper edges of the wall portions adjacent the guide mechanisms 71, in covering relation with respect to the bushing and nut mechanisms 81, 79, permitting access for adjustment of said nut as may be required from time to time.

The aft upper section 14 of the trailer has a roof panel 83, a rear panel 84 and side panels 85 and 86, and is of such size and shape as to nest down and within the aft lower section 12 with the forward edges of said panels substantially flush with the forward edges of said lower section, as illustrated in FIG. 3. The forward edges of the panels forming the aft upper section 14 and the rear edges of the panels forming the forward upper section 13 are fitted with tubular weatherproofing seals 87, 88, respectively, similar to the seal along the edges of the lower forward and aft sections 11, 12 as is hereinabove described.

The side panels of the upper sections 13, 14 of the trailer are provided with a plurality of flush-mounted windows 89, preferably screened, awning-type windows. An entrance door 90 is provided at one side of the forward sections of the trailer, said door, as best illustrated in FIGS. 3 and 8, comprising a lower half section 91 hinged as at 92 to one side of a door frame opening in the side panel 24 of the forward section 11. The upper half section 93 of the door 90 is attached for relative vertical movement against the inside of the lower half section 91 by means of guide mechanisms 71, as used in controlling the relative vertical movement of the upper and lower trailer sections as hereinabove described.

Means is provided for automatically moving the upper half section 93 of the door 90 vertically along with movement of the forward upper section 13 of the trailer with respect to the lower section 11. To this end, as illustrated in FIG. 8a, the upper door section 93 is provided with a pin 94 projecting inwardly from a central position along the top marginal edge of the door section, which pin fits into an opening in a bracket 94a attached as by screw 94b at the inside top of the door frame, whereby the door, when closed, will be hooked to said door frame for movement together with the upper section.

As illustrated in FIG. 4, the interior of the aft lower section 12 may be equipped, for example, with a kitchen nook 95 comprising a table and combination bench and room divider 96. The area forward of the kitchen nook is preferably utilized for kitchen appliances (not illustrated). The room divider portion of the kitchen nook may be in the form of a storage cabinet having a counter top and, includes a plurality of decorative posts 97 which are attached to the aft upper section 14 and are received within openings in the storage cabinet when the trailer collapses vertically. Equidistantly spaced with the decorative posts 97 and transversely centrally located within the trailer is a vertically acting aft hydraulic cylinder 98 having an exposed actuating piston 99, the upper end of which is secured to the roof panel 83, and a cylinder 100, the lower end of which is attached to the bottom framework of the aft lower section 12 and which is completely hidden within the divider cabinet. Preferably, the decorative posts 97 are of such size and material as to simulate the appearance of the actuating piston 99, to disguise the operating mechanism. Hydraulic lines 101 partially illustrated at each end of the double-acting hydraulic cylinder 98 lead to an associated pump, drive motor and control mechanism of well known construction and not herein further described.

As further illustrated in FIG. 4, the interior of the forward section of the trailer may be partitioned into a washroom 102, a shower room 103, and closets 104 and 105. The partitioning is indicated generally at 106, and, as illustrated in FIGS. 9 and 10, wherein the partition leading into the washroom 102 is illustrated in detail, comprises spaced parallel side panels 107, 108 at one side of the door and spaced, parallel side panels 109, 110 at the other side of the door. The lower ends of the panel pairs 107, 108 and 109, 110 are held in spaced relation against spacers 111, 112, respectively, secured against the bottom panel 22 of the forward lower trailer section 11. A U-shaped upper partition panel 113 is secured in inverted position against the inside of the roof panel 57 of the forward upper section 13, and has side portions 114, 115 which telescope within the spaces between the respective pairs of side panels 107, 108 and 109, as is best illustrated in FIG. 10. The door 116 provided in the partition is comprised of an upper door section 117 and a lower door section 118, said upper door section being hinged, as at 119, to the inner edge of the side portion 115 of the upper partition panel 113, and said lower door section being hinged, at its lower end portion only, to the spacer 112 at the lower end of the panel pairs 109, 110, as by a hinge 120. A roller 121 is fitted at the lower edge of the door opposite the hinge 120 to prevent sagging due to the necessarily short length of said hinge. The lower door section 118 is of hollow construction, as are the lower partition wall portions, to permit relative telescoping action with the upper door section 117.

To control the up and down telescoping action of the forward upper trailer section 113 with respect to the forward lower section 11, a hydraulic actuating cylinder 122 is provided, transversely located in the forward end of the trailer, as illustrated in FIG. 4. The hydraulic actuating cylinder 122 may be located inconspicuously in the washroom 102 and provided at its lower end with a suitable enclosure 123. The vertical actuating cylinders 98 and 122 are connected to act in unison, so that the upper trailer sections will move simultaneously up and down within their respective lower sections. Preferably the vertical and horizontal actuating cylinders 98, 122 and 44 and their actuating systems are arranged so as to act simultaneously with appropriate limit switch means controlling fully open and fully collapsed conditions, so that the trailer can be expanded or collapsed simply by the flip of a switch.

While I have illustrated and described herein only one form in which the invention may conveniently be embodied in practice, this embodiment is presented by way of example only and not in a limiting sense. The invention, in brief, comprises all the embodiments and modifications coming within the scope of the following claims.

What I claim as new and desired to secure by Letters Patent is:

1. A collapsible house trailer comprising, in combination, a forward lower section having spaced parallel side walls, a front wall and a floor panel, an aft lower section having spaced parallel side walls, a rear wall and a floor panel, said aft lower section being movable in and out with respect to said forward lower section in telescoping fashion, a forward upper section having spaced parallel side walls, a front wall and a roof panel, said forward upper section being movable up and down with respect to said forward lower section in telescoping fashion, an aft upper section having spaced parallel side walls, a rear wall and a roof panel, said aft upper section movable up and down with respect to said aft lower section and in and out with respect to said forward upper section in telescoping fashion, guide mechanism supporting said forward and aft lower sections in their in and out telescoping motion, a pair of front wheels carried by said forward lower section, a pair of rear wheels carried by said aft lower section, guide means supporting said forward and aft upper sections with respect to their respective forward and aft lower sections in their relative vertical motion, and means for automatically expanding said relatively telescoping sections, said guide mechanism comprising a longitudinal track in each opposing side wall inside corner of said forward section and a plurality of rollers supported within said aft lower section along each side thereof and rollable along said tracks, said guide means comprising a plurality of elongated track plates fixed in spaced, vertical relation along the side, front and back walls of said forward and aft upper sections, said track plates each having a longitudinal slot and comprising a central section of uniform thickness, inclined portions of increasing thickness extending from the ends of said central section, and end portions of uniform greater thickness than that of said central section extending from the ends of said inclined portions, and a plurality of headed members fixed with respect to said forward and aft lower sections and extending through one each of said track plate slots and bearing against the inside of said track plate.

2. A collapsible house trailer as defined in claim 1 wherein said means for automatically expanding said relatively telescoping sections comprises a horizontal hydraulic cylinder acting between said forward and aft lower sections, a vertical hydraulic cylinder acting between said aft upper and lower sections, and a vertical hydraulic cylinder acting between said forward upper and lower sections.

3. A collapsible house trailer as defined in claim 1 including a plurality of interior partitions, each partition comprising an upper partition section and a lower partition section, each lower partition section comprising a pair of spaced parallel panels defining an interior recess for receiving an upper partition section, each upper partition section being secured with respect to an upper trailer section roof, and each lower partition section being secured with respect to a lower trailer section floor panel.

4. A collapsible house trailer as defined in claim 3 including an exterior door in corresponding side walls of said forward trailer sections, said exterior door comprising a lower half door section hinged along one side to a frame opening in one side wall of said forward lower trailer section, an upper half door section, and guide means for supporting said upper half door section for vertical movement against and with respect to one side of said lower half door section.

5. A collapsible house trailer comprising, in combination, a forward lower section having spaced parallel side walls, a front wall and a floor panel, an aft lower section having spaced parallel side walls, a rear wall and a floor panel, said aft lower section being movable in and out with respect to said forward lower section in telescoping fashion, a forward upper section having spaced parallel side walls, a front wall and a roof panel, said forward upper section being movable up and down with respect to said forward lower section in telescoping fashion, an aft upper section having spaced parallel side walls, a rear wall and a roof panel, said aft upper section being movable up and down with respect to said aft lower section and in and out with respect to said forward upper section in telescoping fashion, guide mechanism supporting said forward and aft lower sections in their in and out telescoping motion, a pair of front wheels carried by said forward lower section, a pair of rear wheels carried by said aft lower section, guide means supporting said forward and aft upper sections with respect to their respective forward and aft lower sections in their relative vertical motion, means for automatically expanding said relatively telescoping sections, a plurality of interior partitions, each partition comprising an upper partition section and a lower partition section, each lower partition section comprising a pair of spaced parallel panels defining an interior recess for receiving an upper partition section, each upper partition section being secured with respect to an upper trailer section roof, and each lower partition section being secured with respect to a lower trailer section floor panel.

6. A collapsible house trailer as defined in claim 5 including a door in one of said partitions, said door comprising a lower door section hinged to a frame opening in one of said lower partition sections, said lower door section comprising a pair of spaced parallel panels defining an interior recess, said door further comprising an upper door section hinged to a frame opening in one of said upper partition sections and receivable in said interior recess of said lower door section.

7. A collapsible house trailer comprising, in combination, a forward lower section having spaced parallel side walls, a front wall and a floor panel, an aft lower section having spaced parallel side walls, a rear wall and a floor panel, said aft lower section being movable in and out with respect to said forward lower section in telescoping fashion, a forward upper section having spaced parallel side walls, a front wall and a roof panel, said forward upper section being movable up and down with respect to said forward lower section in telescoping fashion, an aft upper section having spaced parallel side walls, a rear wall and a roof panel, said aft upper section being movable up and down with respect to said aft lower section and in and out with respect to said forward upper section in telescoping fashion, guide mechanism supporting said forward and aft lower sections in their in and out telescoping motion, a pair of front wheels carried by said forward lower section, a pair of rear wheels carried by said aft lower section, guide means supporting said forward and aft upper sections with respect to their respective forward and aft lower sections in their relative vertical motion, means for automatically expanding said relatively telescoping sections, a room divider comprising a cabinet secured with respect to a lower trailer section floor panel, and a plurality of laterally-spaced and aligned decorative posts attached with respect to an upper trailer section roof and receivable vertically in openings in the top of said cabinet, said means for automatically expanding said relatively telescoping sections comprising a vertical hydraulic cylinder in said cabinet and fixed with respect thereto and having a piston in the form of said posts and in alignment therewith and attached at its outer end with respect to said upper trailer section roof.

8. A collapsible house trailer comprising, in combination, a forward lower section having spaced parallel side walls, a front wall and a floor panel, an aft lower section having spaced parallel side walls, a rear wall and a floor panel, said aft lower section being movable in and out with respect to said forward lower section in telescoping fashion, a forward upper section having spaced parallel side walls, a front wall and a roof panel, said forward upper section being movable up and down with respect to said forward lower section in telescoping fashion, an after upper section having spaced parallel side walls, a rear wall and a roof panel, said aft upper section being movable up and down with respect to said aft lower section and in and out with respect to said forward upper section in telescoping fashion, guide mechanism supporting said forward and aft lower sections in their in and out telescoping motion, a pair of front wheels carried by said forward lower section, a pair of rear wheels carried by said aft lower section, guide means supporting said forward and aft upper sections with respect to their respective forward and aft lower sections in their relative vertical motion, and means for automatically expanding said relatively telescoping sections, and an elongated scraper member fixed along the underside of the rear transverse edge portion of said floor panel of said forward lower section and in contact with the underside of said floor panel of said aft lower section for scraping along the underside of said aft lower section floor panel as the aft lower section is retracted into the forward lower section.

References Cited by the Examiner

UNITED STATES PATENTS

| | | | |
|---|---|---|---|
| 928,564 | 7/09 | Tippmann | 296—26 |
| 1,436,984 | 11/22 | Follett | 296—23 |
| 2,756,094 | 10/51 | Marple | 296—23 |
| 2,987,342 | 6/61 | Meaker | 296—23 |

FOREIGN PATENTS

| | | |
|---|---|---|
| 174,543 | 4/53 | Austria. |
| 1,033,260 | 4/53 | France. |

BENJAMIN HERSH, *Primary Examiner.*

MILTON BUCHLER, *Examiner.*